July 14, 1936. W. B. STOUT 2,047,336
MOTOR CAR
Filed April 16, 1934 13 Sheets-Sheet 1

Inventor
William B. Stout
By Pillson, Mann & Co.
Attys.

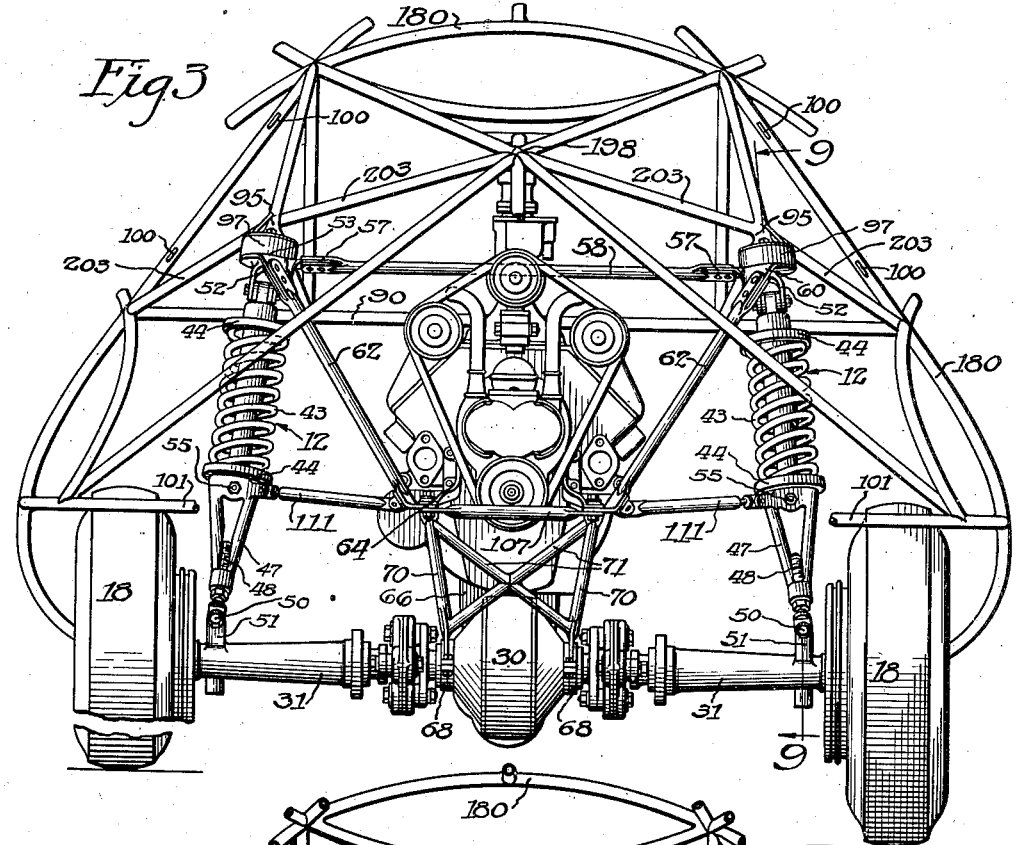
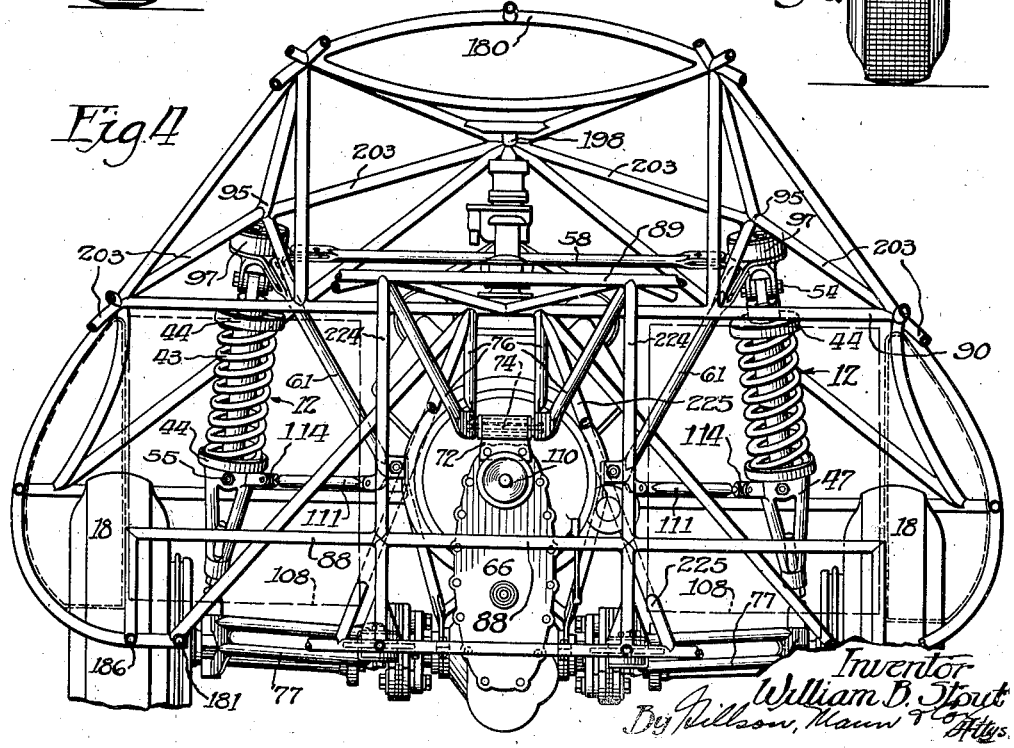

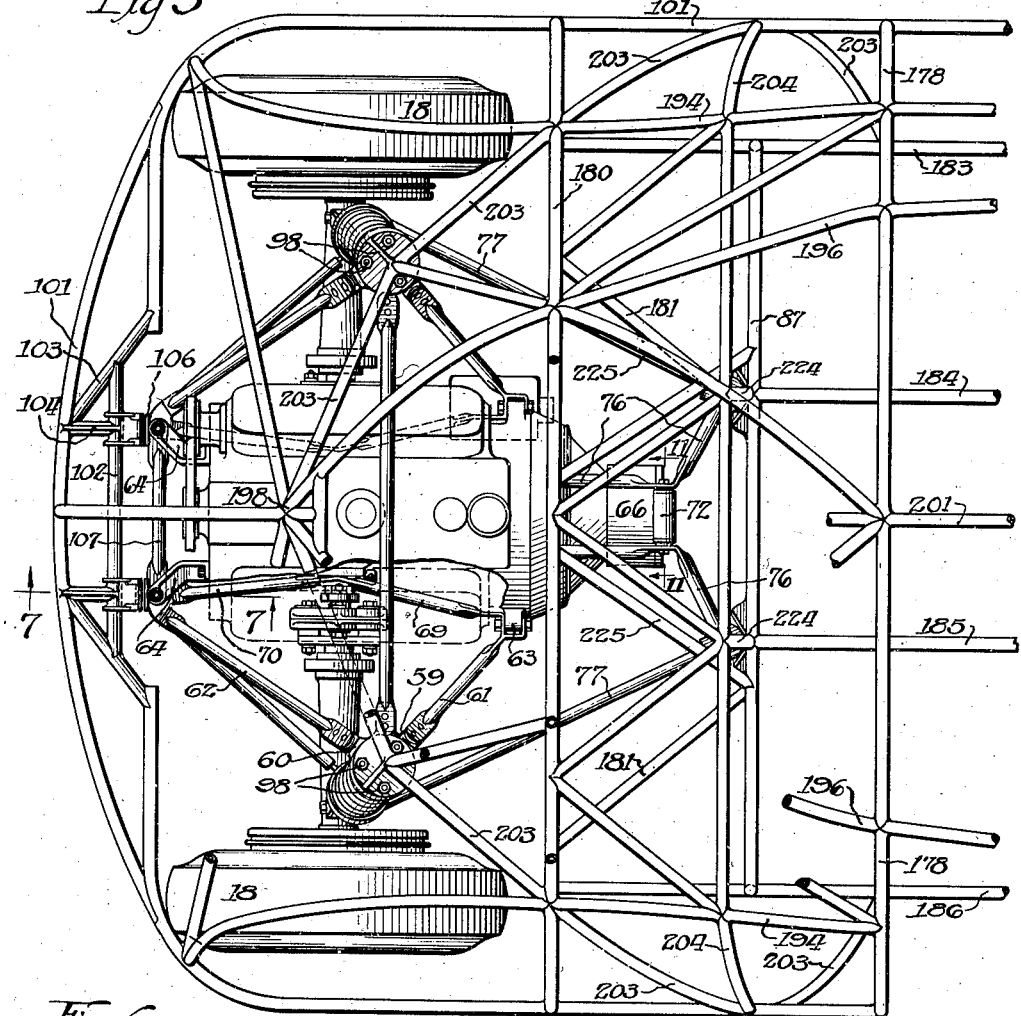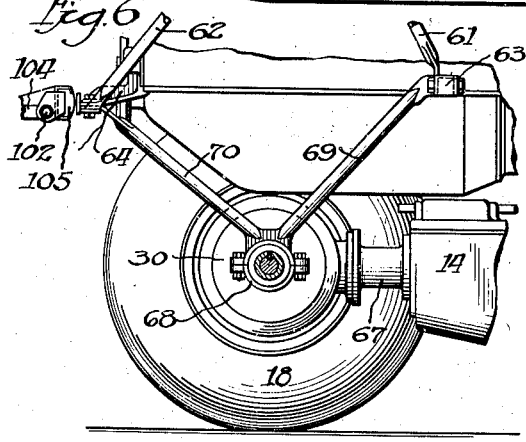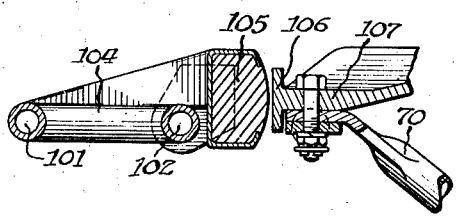

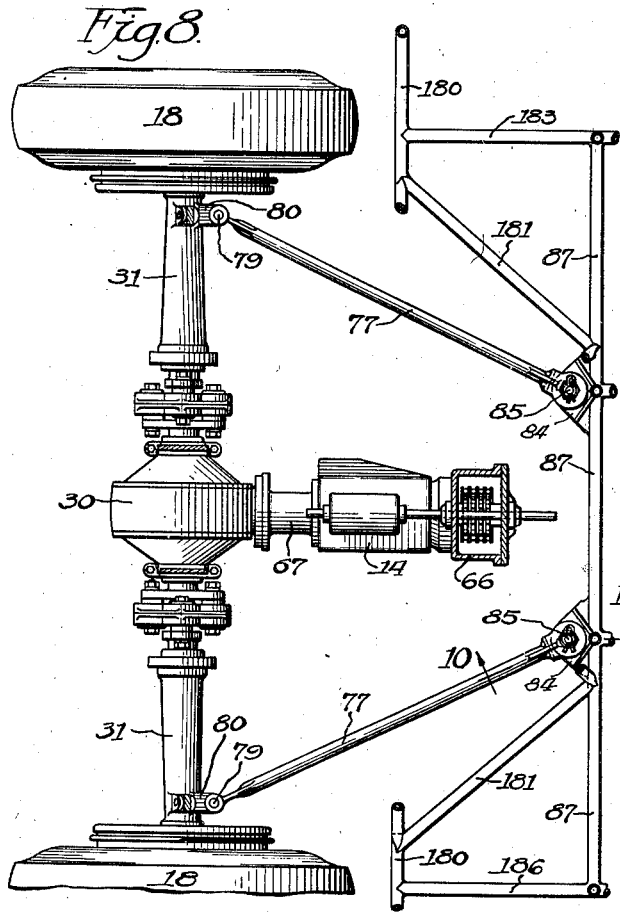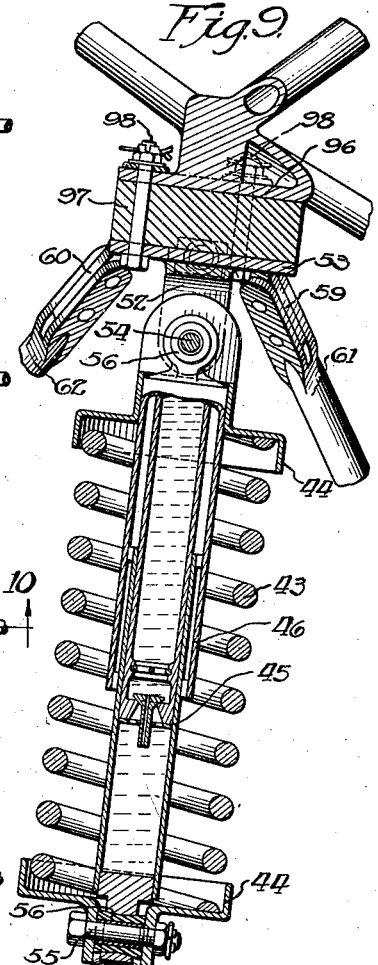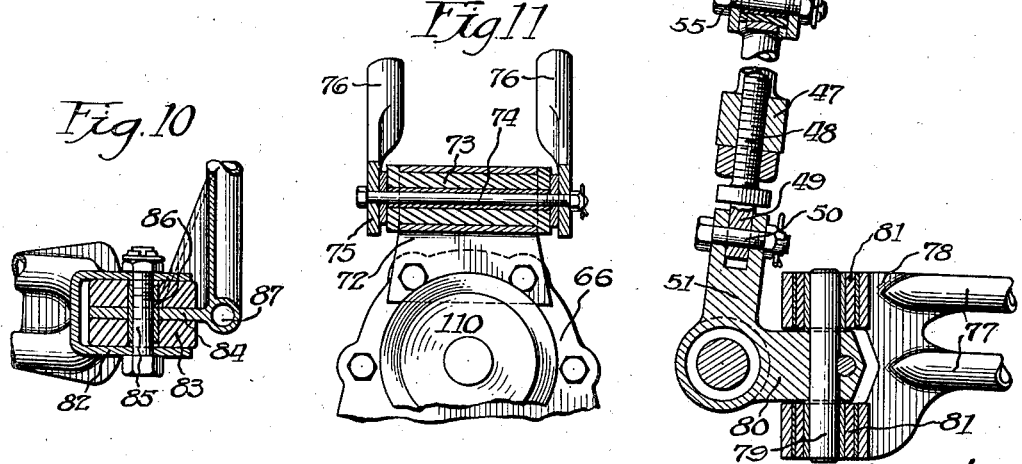

July 14, 1936.  W. B. STOUT  2,047,336
MOTOR CAR
Filed April 16, 1934   13 Sheets-Sheet 5
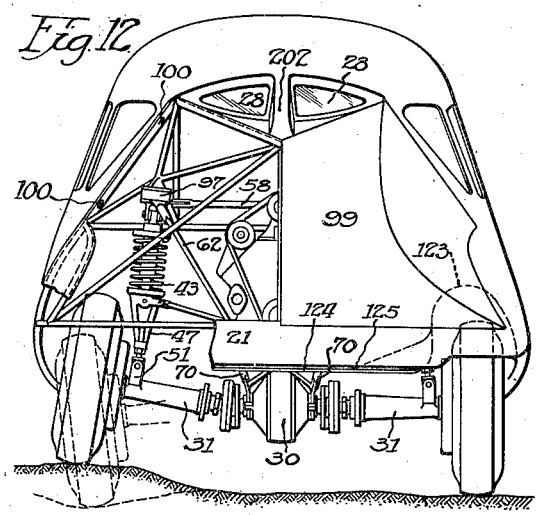
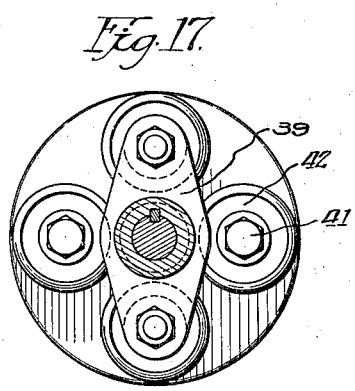
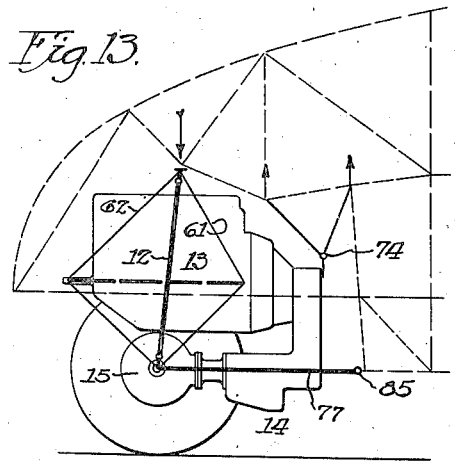
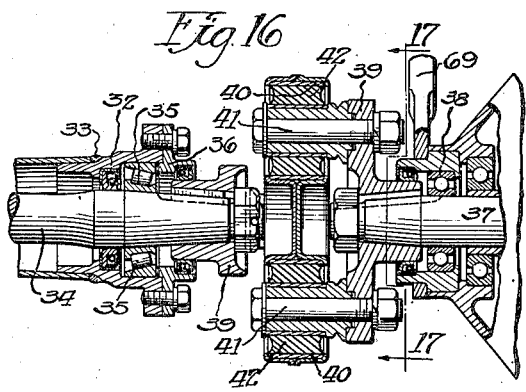
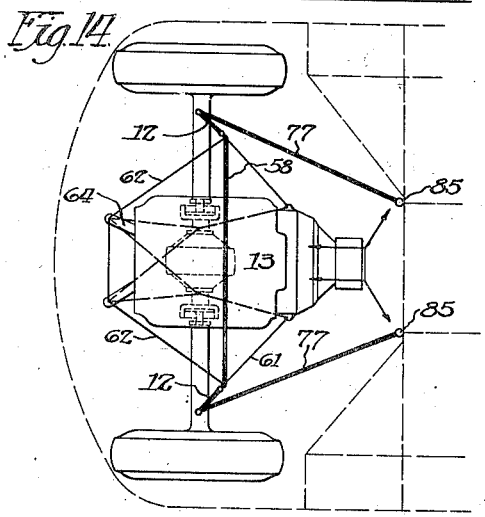
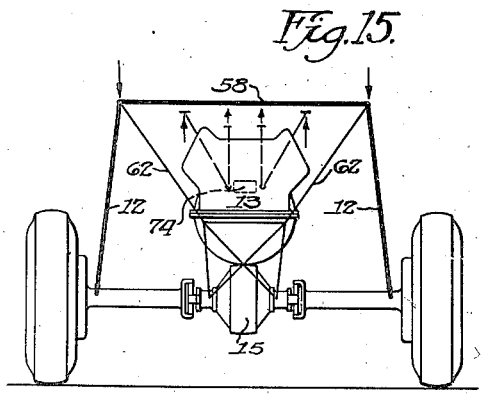
Inventor
William B. Stout

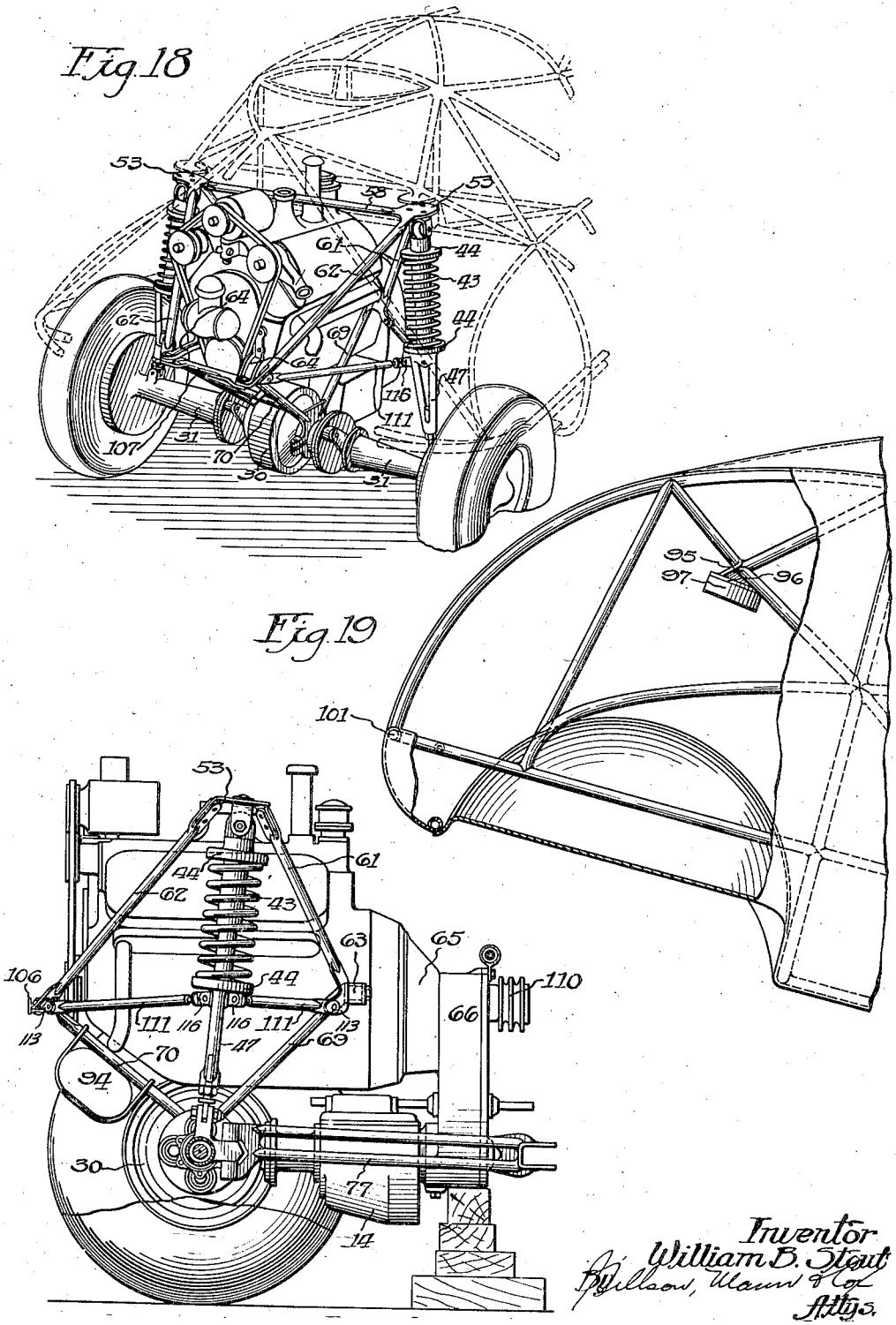

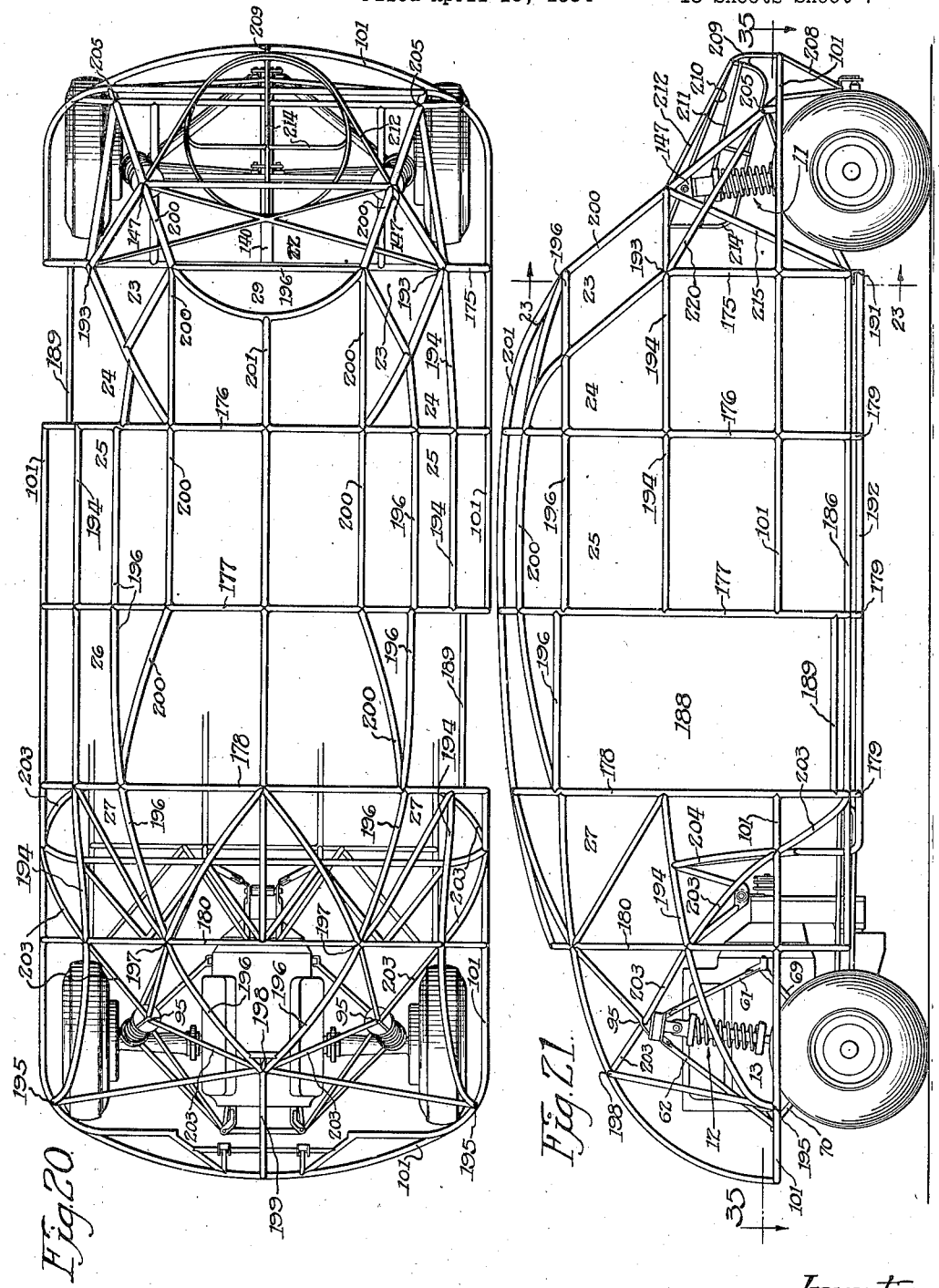

July 14, 1936.  W. B. STOUT  2,047,336
MOTOR CAR
Filed April 16, 1934  13 Sheets-Sheet 8

Inventor
William B. Stout
By Wilson, Mann & Cox
Attys.

July 14, 1936. W. B. STOUT 2,047,336
MOTOR CAR
Filed April 16, 1934 13 Sheets-Sheet 9

Inventor
William B. Stout

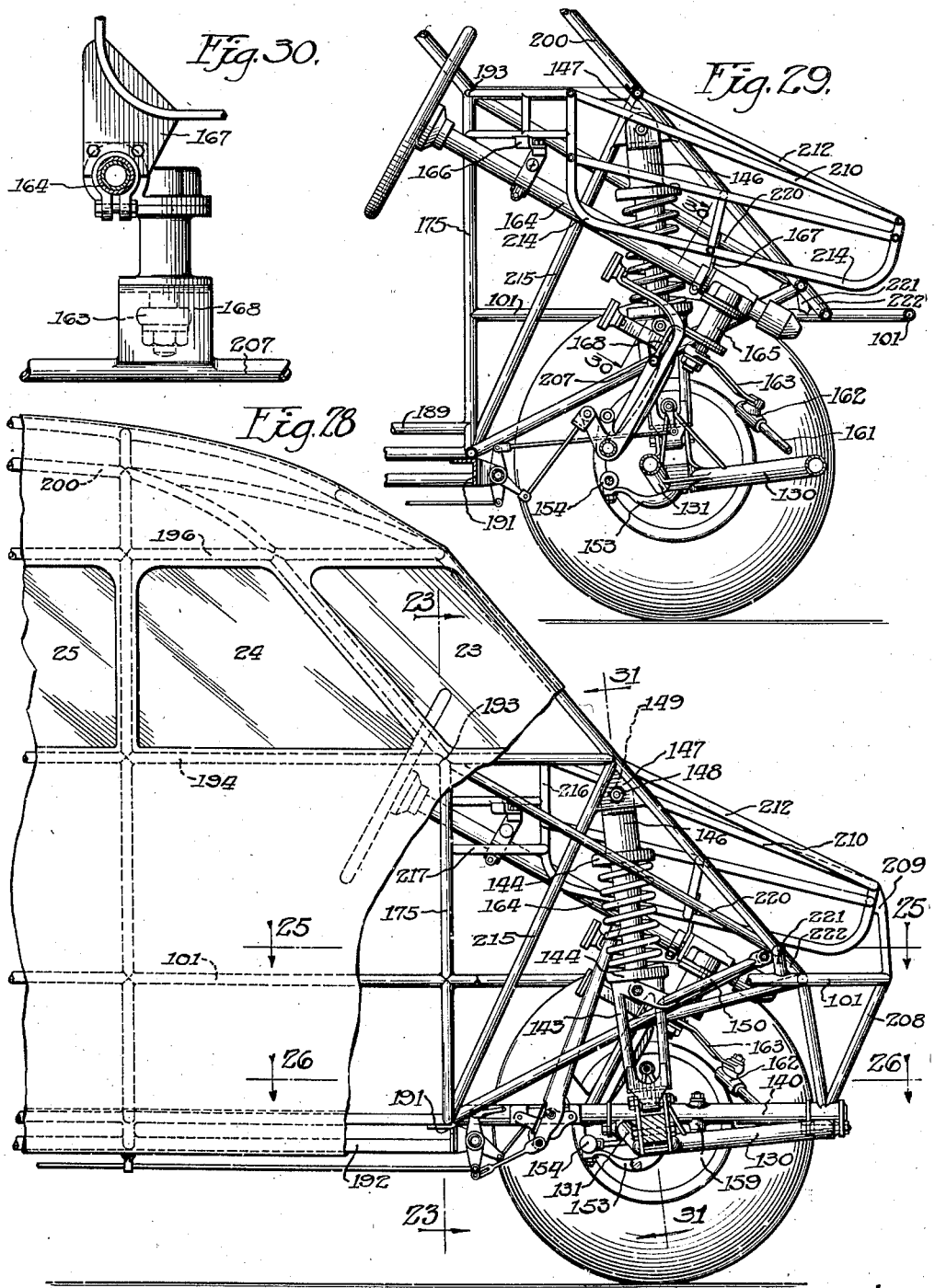

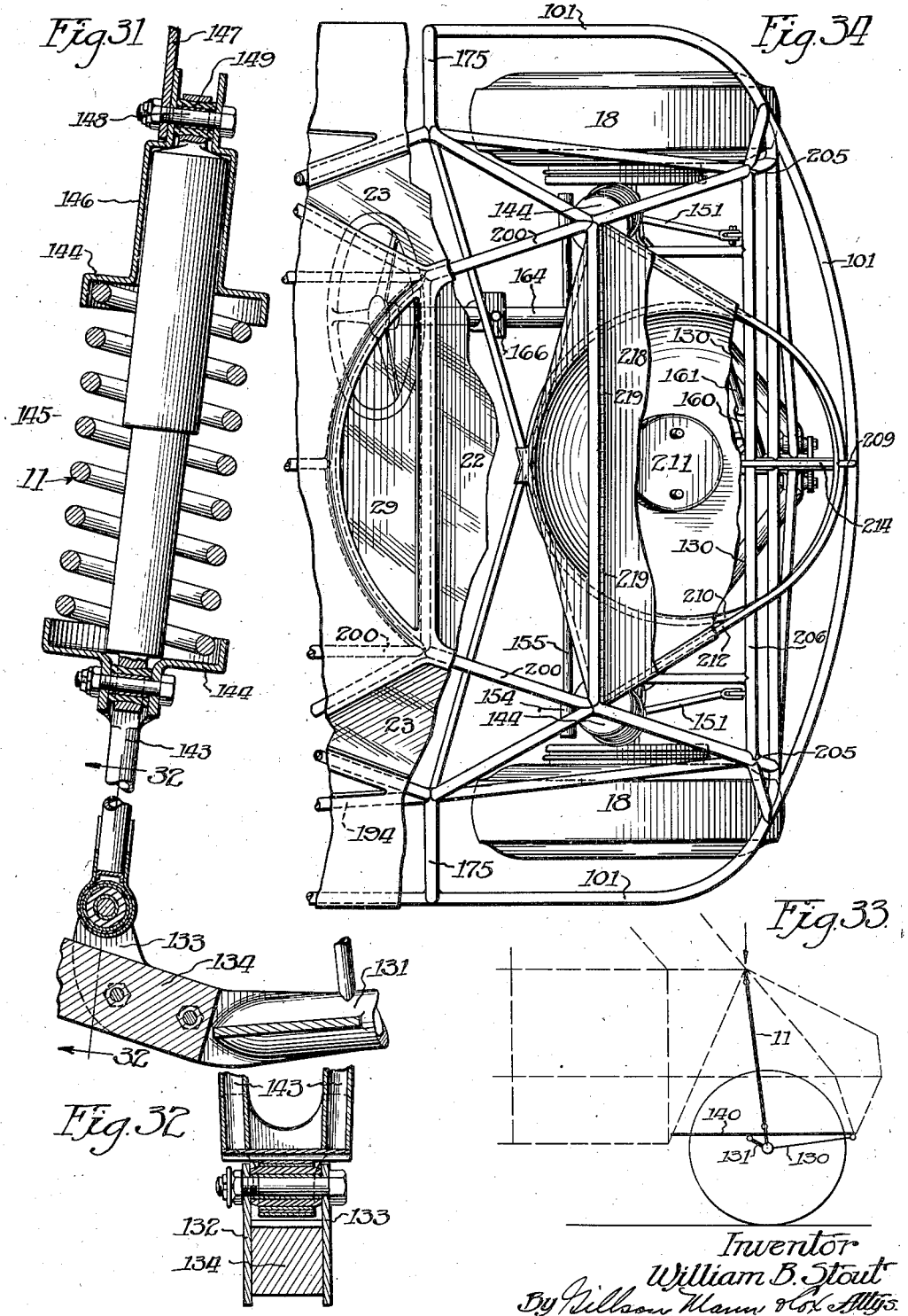

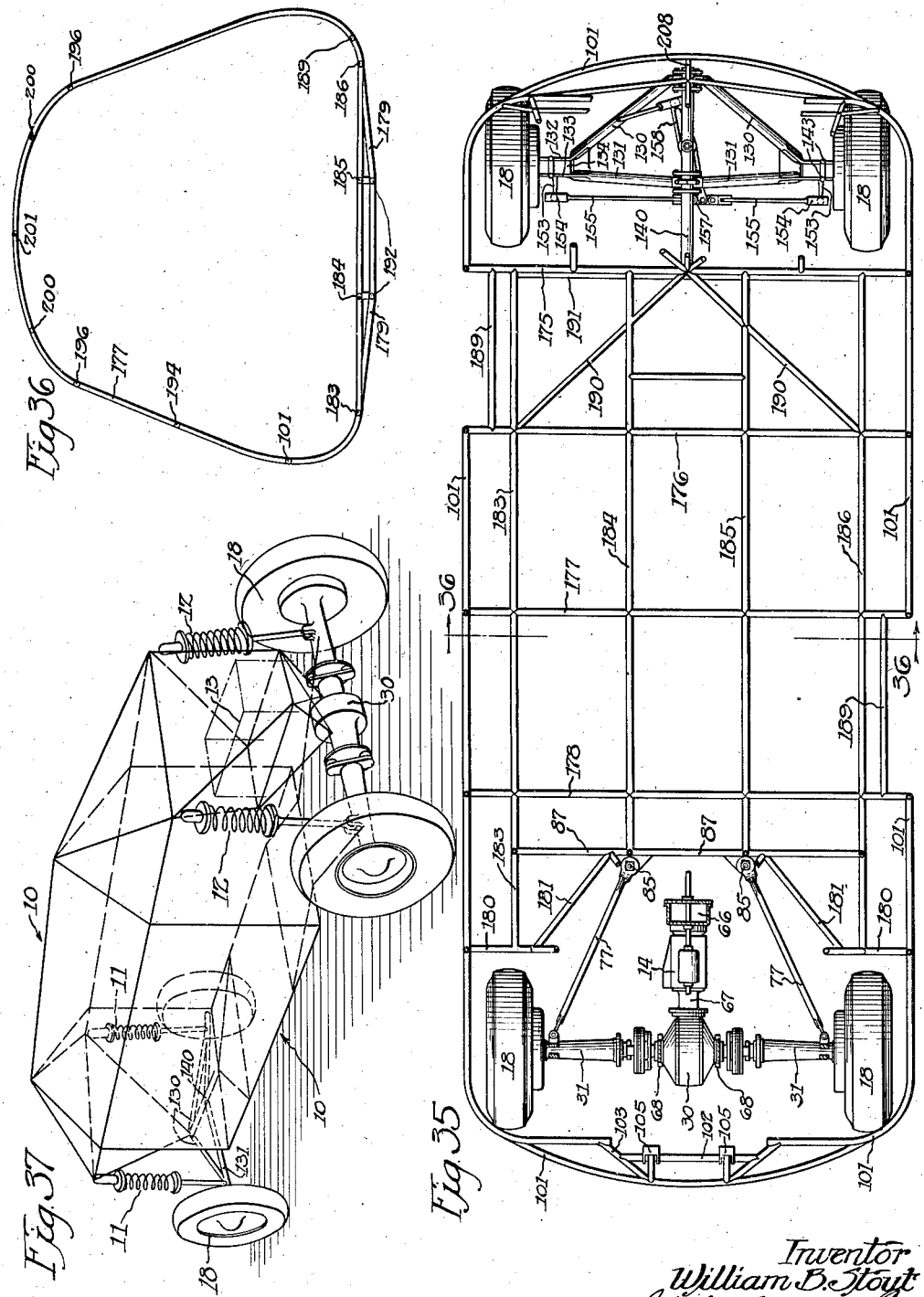

July 14, 1936.  W. B. STOUT  2,047,336
MOTOR CAR
Filed April 16, 1934  13 Sheets-Sheet 13
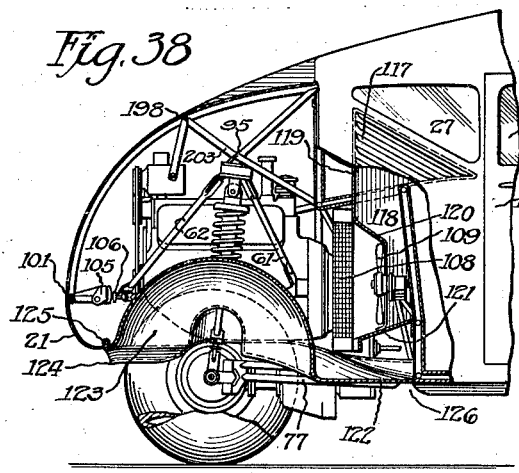
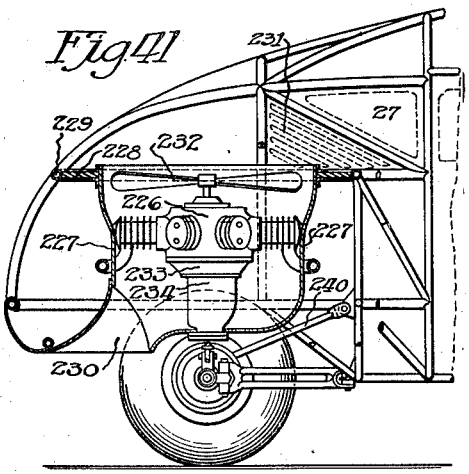
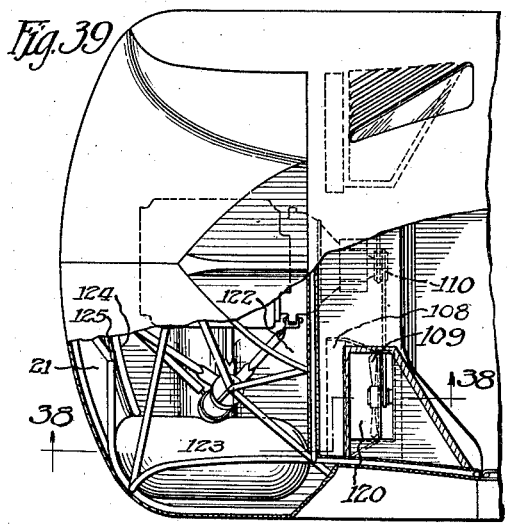
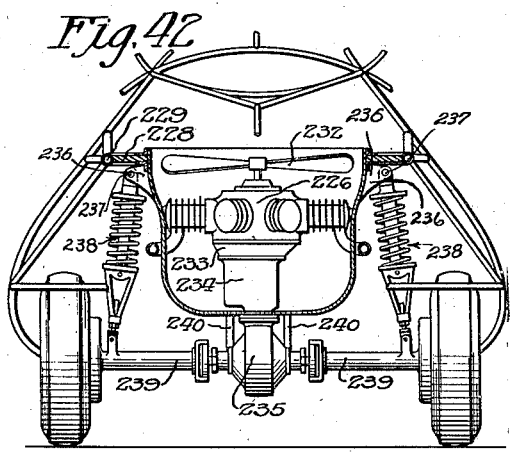
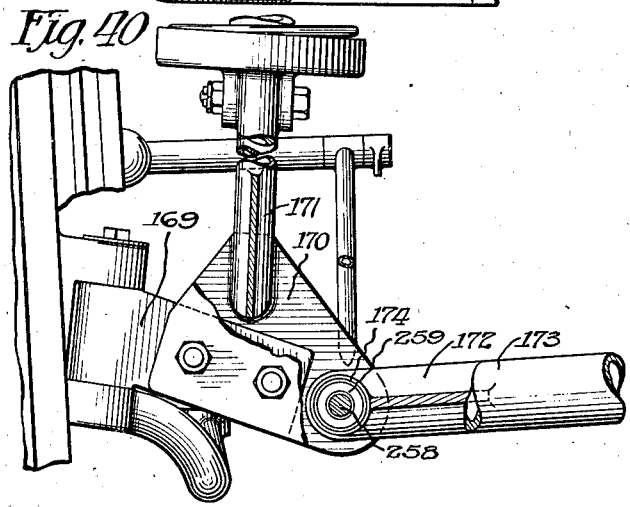
Inventor
William B. Stout
By Attys.

Patented July 14, 1936

2,047,336

UNITED STATES PATENT OFFICE 2,047,336

MOTOR CAR

William B. Stout, Detroit, Mich., assignor to Stout Motor Car Corporation, Dearborn, Mich., a corporation of Michigan Application April 16, 1934, Serial No. 720,786

32 Claims. (Cl. 180—54)

This invention relates to motor cars and has for its principal objects to increase the wheel base and usable body space (length, width and head room) for a given over-all length, width and height of car, to reduce the aerodynamic resistance, to mount the power plant at the rear and support it independently of the body, to make the power plant easily accessible while in place and readily removable as a sub-assembly for repair and replacement, to resiliently support the differential gearing and housing, to exclude motor noise and smell from the body, to allow independent up and down movement of each wheel, to support the body resiliently from points above its center of gravity and insulate it from vibrations and road noise, and to reduce the weight and the power required to drive the car.

An embodiment taking advantage of parts and sub-assemblies subject to quantity production is shown in the drawings in which Fig. 1 is a side elevation about one-twentyfifth size;

Fig. 3 is a rear elevation with the shell of the body and the muffler removed and parts of the frame broken away;

Fig. 4 is a transverse section taken on the line 4—4 of Fig. 2, looking rearwardly;

Fig. 5 is a plan view of the rear end of the car, the shell being removed and portions of the frame being broken away;

Fig. 6 is a side elevation of the lower portion of the motor showing the support for the differential, the rear axle being in section;

Fig. 7 is a longitudinal vertical section taken on the line 7—7 of Fig. 5, showing a resilient bumper for transmitting severe blows at the rear to the frame that supports the motor;

Fig. 8 is a horizontal section on the line 8—8 of Fig. 2, looking downwardly;

Fig. 9 is a section on the line 9—9 of Fig. 3, through one of the rear struts;

Fig. 10 is a section on the line 10—10 of Fig. 8, showing the joint between one of the radius rods and a portion of the body frame;

Fig. 11 is a section on the line 11—11 of Fig. 5, showing the connection between the front end of the power plant and a torque brace from the body frame;

Fig. 12 is a rear elevation of the motor car with one cover of the power plant removed and showing the position of the parts as a rear wheel passes over a bump;

Figs. 13, 14 and 15 are diagrams in side elevation, plan and rear elevation of the mounting for the power plant, illustrating the lines of force;

Fig. 16 is a longitudinal section through a portion of the rear axle adjacent to the differential;

Fig. 17 is a transverse section taken on line 17—17 of Fig. 16;

Fig. 18 is a perspective view taken from the right rear of the motor car;

Fig. 19 is a side elevation showing how the body may be removed from the rear axle and power plant assembly;

Figs. 20 and 21 are plan and side elevations of the motor car with the shell of the body removed, and certain parts omitted to show the general arrangement without confusion;

Figure 23:
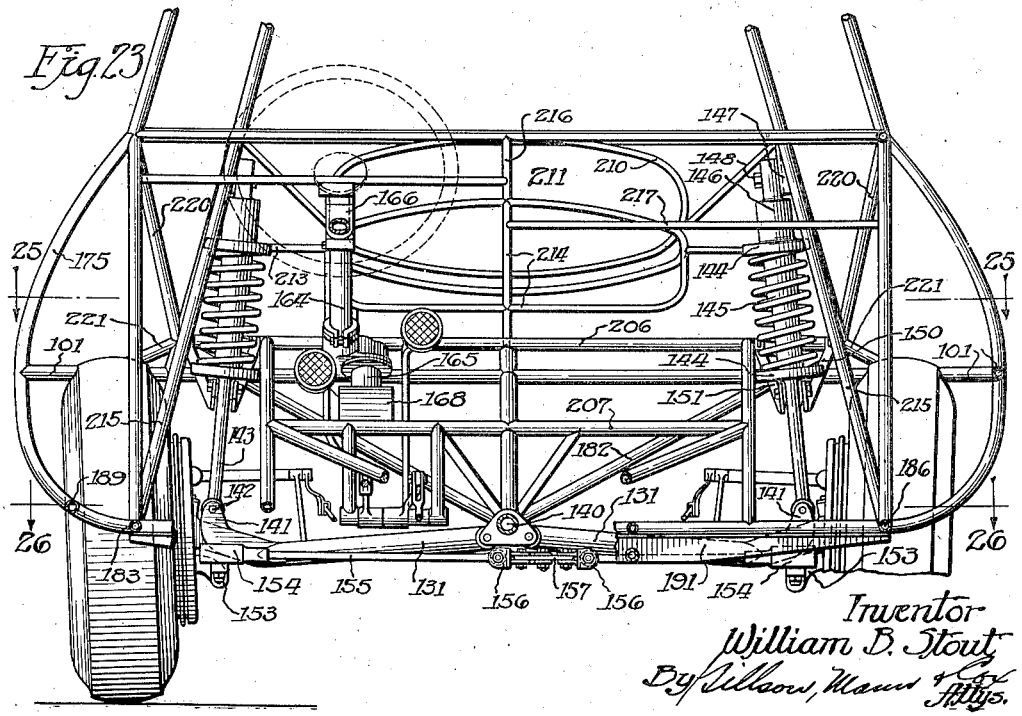
Fig. 23 is a section taken on the line 23—23 of Fig. 21, looking forwardly, with the shell of the body being removed and a part of the frame being broken away.
Figure 26:
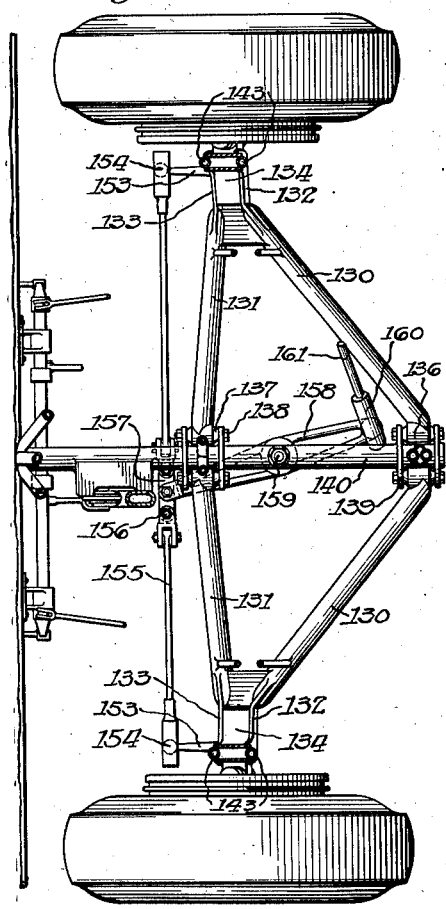
Figure 25:
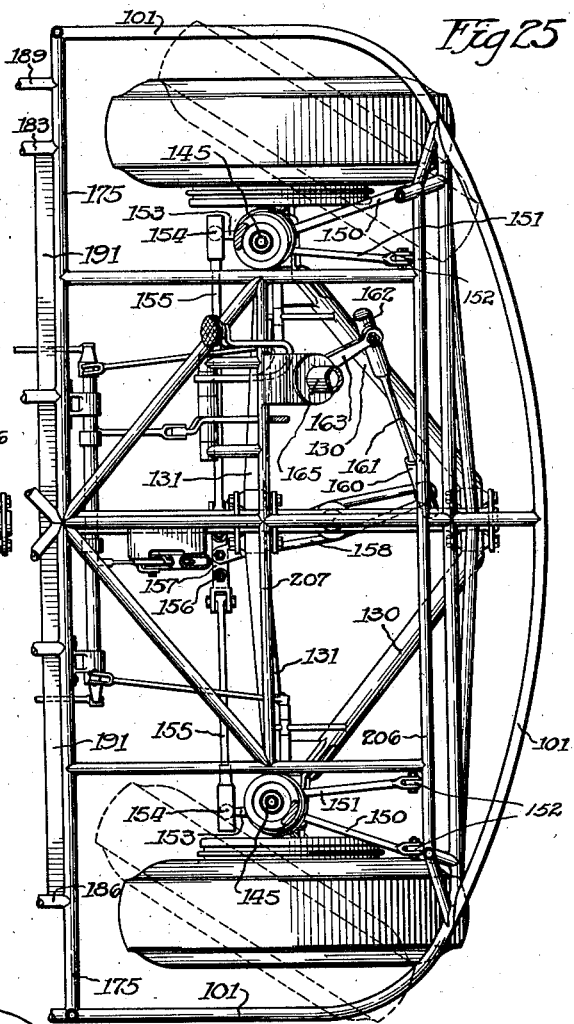
Figure 27:
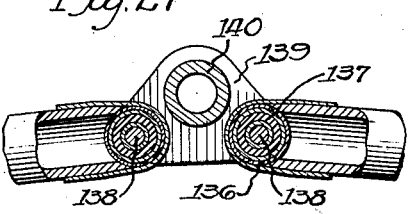

Figs. 25 and 26 are horizontal sections taken respectively on the line 25—25 and 26—26 of Fig. 23, looking downwardly;

Fig. 27 is a vertical section, illustrating the joint between the front axle sections and the body frame, with parts broken away.

Figure 22:
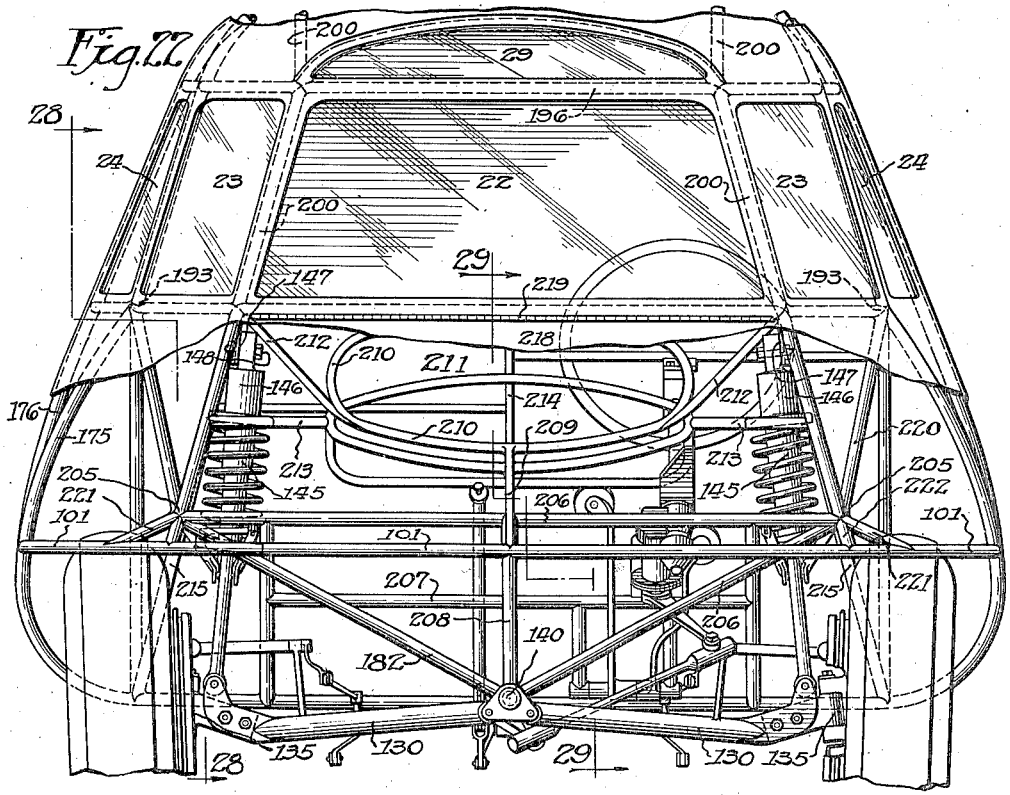
Fig. 22 is a front elevation with the shell of the body and a part of the frame broken away.

Figs. 28 and 29 are partial vertical sections taken on the lines 28—28 and 29—29 respectively of Fig. 22;

Fig. 30 is a section taken on the line 30—30 of Fig. 29, looking forwardly;

Fig. 31 is a section taken on the line 31—31 of Fig. 28;

Fig. 32 is a section taken on the line 32—32 of Fig. 31;

Fig. 33 is a diagram of the lines of force involved in the support for the front of the body;

Fig. 34 is a plan view of the front end of the motor car with a portion of the shell removed to show the tire carrier and the front axle mechanism;

Fig. 35 is a horizontal section taken on the line 35—35 of Fig. 21, looking downwardly;

Fig. 36 is a transverse section taken on line 36—36 of Fig. 35; and

Fig. 37 is a diagram in perspective showing the general arrangement for carrying the body and the power plant.

Fig. 38 is a partial longitudinal section through the rear end of the car on line 38—38 of Fig. 39 to bring out features of the engine cooling system;

Fig. 39 is a plan view of the rear end of the car with parts broken away for the same purpose;

Fig. 40 is a fragment of a front axle construction embodying a modification;

Figs. 41 and 42 are longitudinal and transverse sections through the rear end of the car, illustrating a modified organization including a radial engine.

But these illustrations and the description of the particular constructions are used for the purpose of disclosure only and not to indicate that the invention is so limited.

*General description*

By looking first at Fig. 37 it will be seen that the body, represented roughly as a box 10, is resiliently borne on struts 11—11, at the front, and 12—12 at the rear, all of which extend to such height that the center of mass of the body is, in effect, swung from the tops of four columns, standing on the axles, one close to each wheel.

Figure 24:
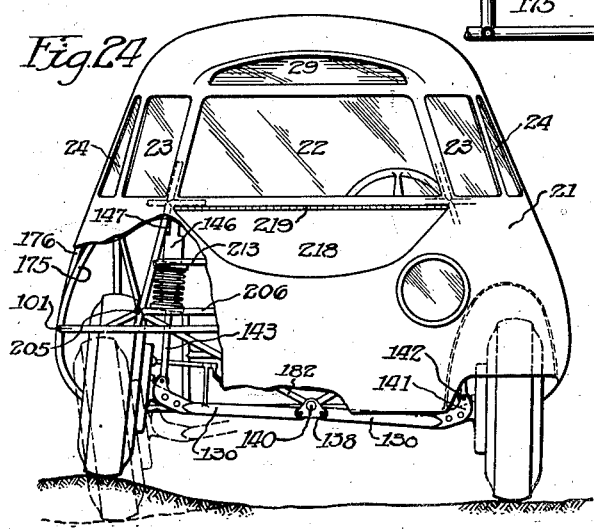
Fig. 24 is a front elevation with a portion of the body broken away showing the position of the parts when a front wheel passes over a hump.

Turning to Figs. 13, 14 and 15, it will be found that the motor 13, transmission gearing 14 and differential gearing 15 are, in effect, swung between and from the top of the two rear columns 12—12, and borne thereby independently of the support for the body at the rear end. This general scheme of carrying the load makes for stability and smoothness in travel, and goes well with bodies shaped to reduce aerodynamic resistance (Figs. 1, 12 and 24) and wheels arranged for independent up and down movement in passing over individual obstructions (Figs. 12 and 24).

Figure 1:
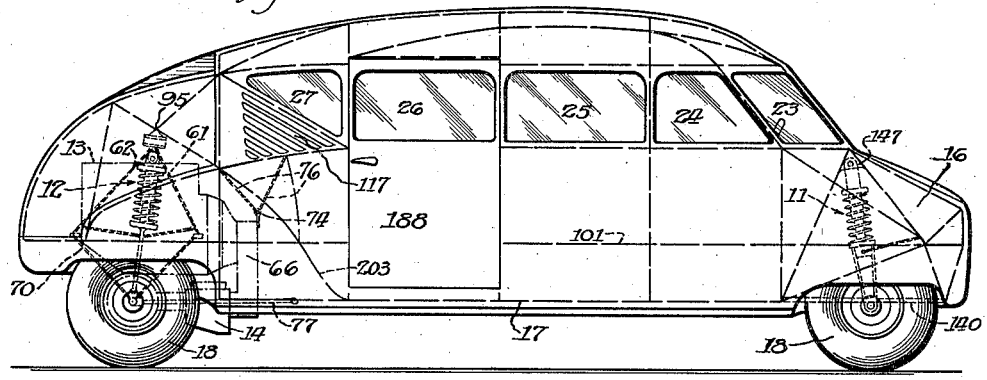

The body here illustrated is similar to that disclosed in my prior application, Serial No. 659,712, filed March 6, 1933, in that a longitudinal section, or any section at an angle to the front up to about 45°, is shaped approximately like an air-foil or a cross section of an aeroplane wing. There is a slight deviation from the air-foil at the front, as indicated by 16, in Fig. 1, where an extension is made to accommodate a spare tire carrier, but that has an almost inappreciable effect on the air resistance. There are no running boards, the floor line 17 is approximately on a level with the axes of the wheels 18 (Figs. 1 and 21). The side walls rise in outward curves from the floor line and turn inwardly to present easy sloping sides (Figs. 12, 24 and 36) blending with the gently curved top.

The frame work is a skeleton of tubing (preferably seamless chrome molybdenum steel, but choice will vary) welded at the joints into one hollow truss, spanning the distance between the supporting struts 11, 12. It is covered externally and internally with shells 21 (made of sheet material—steel, aluminum, laminated wood and aluminum sheets, and such like, welded, riveted or screwed to the frame work) and the intervening spaces are packed with sound and heat insulating material.

Windows 22, 23, 24, 25, 26, 27, 28 and 29 fitted with laminated "glass" afford generous vision in all directions.

Both the frame and the shell extend over and about the upper portion of the wheels, the lower portion of which form practically the only projection beyond the enclosure of the body. The wheels are of small diameter and include low pressure tires of great cross section, secured to rims which are practically one with conventional hubs mounted on customary bearings.

The front wheels steer, the rear wheels drive, and all four are equipped with brakes.

The motor and the body are supported separately and rubber in the several joints protects the body from shocks, noise and vibration.

*The rear end*

The rear axle is, for the most part, like that used in a model AA Ford, and the rear wheel brakes, etc., correspond.

At each side of the differential housing 30 the axle housings 31 are cut away, and each is equipped with a flanged steel forging 32 (Fig. 16) telescoping therewith and welded at 33. Each axle shaft 34 is shortened, and its inner end journaled in roller bearings 35 fitted to the forging 32, and held in place by the cap 36. Interposed between the axle shafts 34 and stub shafts 37, journaled on bearings 38, in the differential housing 30, is a universal joint, including two cross arms 39 fixed to the respective shaft ends, and connected with a sheet metal ring structure 40 by pins 41 fitted with steel and rubber bushings 42 of familiar construction.

Each strut 12 for supporting the rear end of the body and the power plant includes, in this instance, a conventional spring 43 (Fig. 9) between flanged caps 44 and surrounding the telescoping cylinder 45 and 46, forming an assembly known as an oleo.

Many forms of these devices are well known and it will be sufficient to say that they comprise some sort of spring or other resilient unit associated with a hydraulic brake which controls the yield and rebound of the spring.

Each lower cap 44 is welded to a conical fitting 47, threaded to receive a bolt 48 having a flat head 49, hinged by a pin 50 to a lug 51, welded on top of the corresponding rear axle housing 31, adjacent to the wheel.

Each upper cap 44 is pivoted to a fork 52 on the bottom of a plate 53 (Fig. 9). The pivot bolts 54 and 55 are fitted with rubber insulators 56 comprising a rubber sleeve under endwise compression, and one or more steel bushings.

Each plate 53 has a laterally directed wing 57 (Fig. 3) connected to a tubular cross strut 58.

Each plate 53 also has two downwardly inclined wings 59 and 60 (Fig. 9) connected to the upper ends of inclined stays, or tubular straps 61 and 62, the lower ends of which are bolted to the respective lugs 63 and 64, projecting from crank case of the motor 13 (see Figs. 4, 5, 13, 14 and 15).

Tubular links 111 are pivoted to ears 113 at the lower ends of the motor supporting straps 61 and 62, and have adjustable screw heads 114 (Fig. 4) pivoted to ears 116 on the fittings 47 of the struts 12, and stay the latter near the middle (Figs. 2, 3, 4, 18 and 19).

The motor illustrated is the familiar V-type eight cylinder used in the model AA Ford.

The front end of the conventional motor casing is replaced by a special head 65 (Figs. 2 and 13) which, together with a chain housing 66, supports the front end of the change speed gearing housing 14, the rear end of which is connected by a flanged tube 67 with the front side of the differential housing 30. The motor, the chain housing, transmission casing and the differential housing thus become fixed with respect to each other and form a unit resiliently mounted from the struts 12. Split collars 68 at each side of the differential housing (Figs. 3, 6 and 16) are connected by tubular straps or stays 69 and 70, with the lugs 63 and 64 on the engine casing. Cross braces 71 (Fig. 3) connect the stays 69 and 70 into a rigid frame.

A flanged sleeve 72 (Figs. 2, 5 and 11) is bolted to the top of the chain housing 66 and receives a rubber insulating bushing 73, surrounding a bolt 74, extending through the flattened ends 75 of V-shaped brackets 76 projecting downwardly and inwardly from the body frame.

The power plant is substantially balanced on the struts 12 and the connection last described between the front of that unit and the frame is chiefly to resist driving torque.

The driving thrust and braking stresses from the rear wheels are transmitted to the body frame by radius rods 77 (Figs. 2, 8, 14 and 19) inclining from rear axle housings 31 at the base of the struts 12 to the body frame at about the floor line and in front of the universals in the rear axles. The radius rods consist of two tubes welded to a fork 78 (Fig. 9) pivoted by a pin 79 to a lug 80, welded on the front side of each axle housing 31. The joint between the fork 78 and the pin 79 is fitted with rubber insulating bushings 81. The front end of each radius rod (Fig. 10) is formed into a fork 82, receiving rubber washers 83 on each side of a plate 84 projecting rearwardly from the body frame. The fork and the plate are pivoted together by a bolt 85 surrounded by a sleeve 86.

Turning to Figs. 15 and 19, it will be seen that the power plant, rear axle and rear wheels form a separate assembly ordinarily received in and enclosed by the rear portion of the body shell.

By removing the bolts 98, 74 and 85 (Figs. 5 and 11), the rear axle and power plant assembly is completely disconnected from the body and the latter may be raised (as indicated in Fig. 19) and rolled away on the front wheels.

The plates 84, by which the radius rods are connected to the body frame, are welded to a transverse tube 87 (Figs. 2 and 8) at about the rear end of the floor. Above this there are other transverse tubes 88, 89, 90 and 91, which together with plates 92 and insulating material 93, form a transverse partition, or sound proof bulkhead dividing the motor space from the passenger space, or body proper.

The muffler 94 (Figs. 2 and 19) is carried by the stays 70 on the opposite side of the power plant from the passenger space and near the lower rear edge of the body shell. All the joints between the power plant assembly and the body frame being insulated with rubber, there is practically no vibration or noise transmitted to the interior.

The body frame includes two pedestals 95 (Figs. 2, 3, 18 and 19) having plates 96 corresponding to plates 53 of the struts 12, and supported on the latter through thick rubber pads 97. The plates and the rubber pads are secured together by bolts 98.

The rear part of the body shell (Fig. 12) is formed by two doors 99, hinged at 100, to normally fold together and close the power plant chamber, but when swung open affording complete access to all parts of the power plant.

At the extreme rear of the body the frame includes a curved tube 101 (Figs. 2, 5 and 19) which, together with a short tube 102 and stays 103, 104, forms a stout truss fitted with rubber bumpers 105, to cooperate with the flat faces 106 on the ends of a stay 107 (Fig. 7) connected to the lugs 64 at the rear end of the motor. Thus a severe shock at the rear of the car would be yieldingly transmitted to the heavy mass of the power plant.

Engine cooling system

Figure 2:
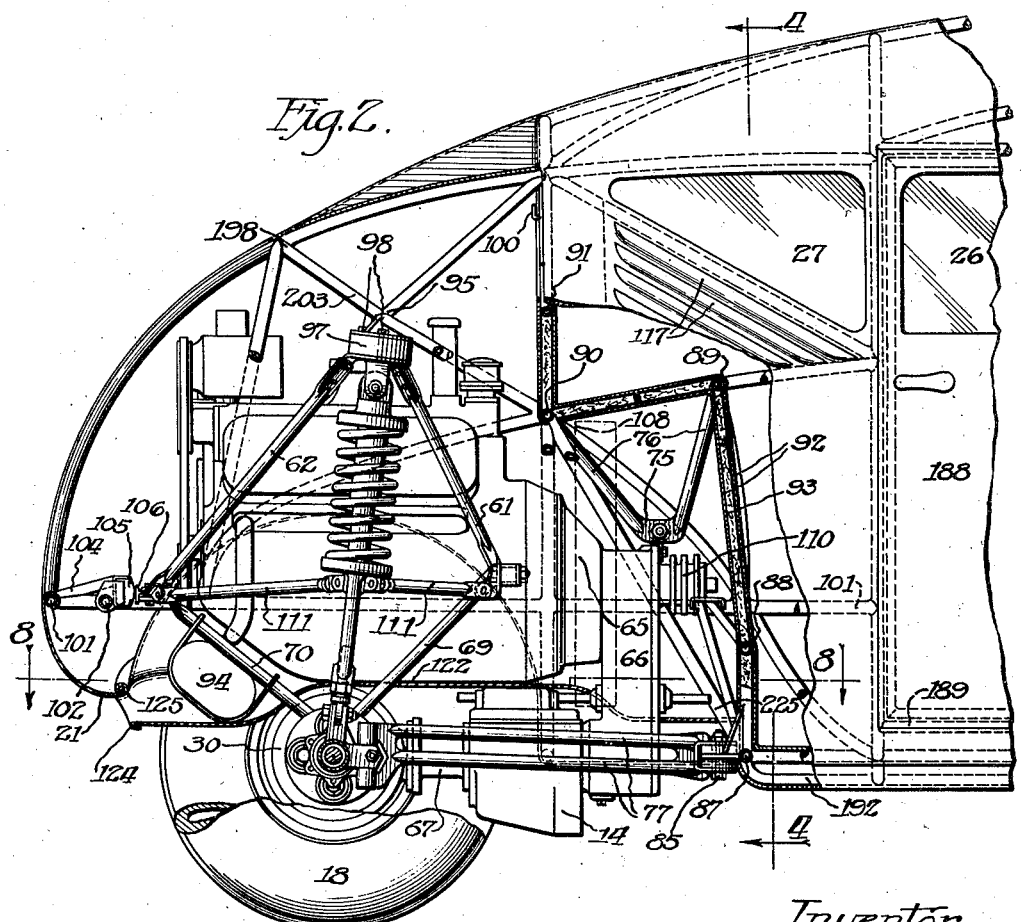
Fig. 2 is an enlarged side elevation of the rear portion, about one-ninth size, with the portion of the body shell and other parts removed to expose the power plant.

The cooling radiators 108 are supported on each side of the body frame just to the rear of the bulkhead and cooperate with fans 109 driven by pulleys 110 on the front end of the crank shaft (Figs. 2, 38 and 39).

Air enters at each side through a set of louvres 117 and is directed downwardly by ducts 118 to the fans 109. The rear wall 119 of each duct is offset forwardly, as indicated at 120, and cooperates with the plate 121 to form a sort of fan housing, enlarging towards the corresponding radiator 108. The lower portion of the engine space is closed by a dust pan 122 extending rearwardly from the floor line substantially in continuation of it, and formed up to make mud guards 123 and provide clearance for the radius rods 77, the rear axle sections 31, the transmission casing 14 and the differential casing 15. The extreme rear edge 124 (Figs. 2, 12 and 38) of the pan is below and substantially parallel to the rolled rear edge 125 of the body shell, thereby providing a long, relatively narrow discharge outlet for the cooling air.

From this it will be seen that the whole motor chamber, or space, is kept under a slight pressure and the cooling air, after passing through the radiators 108, sweeps over the motor and accessories, on its way to the discharge at the lower rear of the car.

The louvres preferably open upwardly (shown best in Figs. 2 and 38) hence, in case of rain some water will enter, and the pan 122 is provided with openings 126 (Fig. 38) at each side, adjacent to the bulkhead, to let the water escape.

The front end

The front axle is in two sections hinged in the middle to allow the wheels up and down movement within the prescribed limits.

Each section of the front axle (Figs. 22 to 26 inclusive) includes tubes 130 and 131 with their flattened outer ends 132 and 133 welded to a short stub 134 of a conventional front axle connected by a steering knuckle 135 (Fig. 22) with a spindle journaled in a front wheel 10, equipped with brakes, etc., as usual.

The inner ends of the tubes 130 and 131 are spread apart, as best shown in Figs. 26 and 35, and terminate in bearings 136, receiving insulating rubber bushings 137 and bolts 138, by which they are hinged to plates 139 (Figs. 22, 26 and 27) welded to a tube 140, extending lengthwise along the bottom of the body frame.

The flattened end portions 132 and 133 are turned upwardly to form hinge flanges 141 (Figs. 22 and 24) pivoted by a bolt 142 to the lower end of a fitting 143, welded to the lower cap 144 (Figs. 23 and 28) of an oleo 145, the upper cap 144 of which is welded to a stem 146.

The front end of the body framing includes two pedestals in the form of plates 147 (Figs. 22, 23 and 28) to which the stems 146 are pivoted by bolts 148, and insulating rubber bushings 149.

The upper end of each fitting 143 (Figs. 22, 23, 25 and 28) is pivoted to links 150 and 151, which have their forward ends spread apart and pivoted to transverse ears 152 of the body frame, and serve to stay the struts during the up and down movement of the wheels.

Fig. 24 illustrates the positions of the parts assumed as the front wheels run over a bump.

In some instances the movements of the front wheel, as indicated in this figure, will be objectionable, in which case the short axle stub 169 (Fig. 40) may be fixed to plates 170, in turn fixed to the base fitting 171 of the front oleo, thereby making the wheel conform very nearly to the up and down movements of the lower portion of the oleo strut. The pivotal movement is allowed by joining the tubes 172 and 173 (corresponding to the tubes 130 and 131 in Figs. 24 to 26) with a tubular fitting 174, journaled on a pintle 258 equipped with an insulating rubber bushing 259.

The steering gear

The steering knuckle arms 153 (Figs. 25 and 26) are connected by universals 154 to the remote ends of links 155, the adjacent ends of which are connected by other universals 156 with a union 157 pivoted to the rear end of an intermediate lever 158, fulcrumed at 159 on the underside of the tube 140 and having its front end connected by universal 160 to one end of a connecting rod 161, the opposite end of which is connected by universal 162 with the steering arm 163 which is operated by a conventional steering post 164 and gear assembly 165 mounted on brackets 166, 167 and 168, welded to the body frame work (Figs. 29 and 30).

The body

The lower portion of the body frame work is best shown in the plan section (Fig. 35) which is taken on the line 35—35 of Fig. 21. There are five transverse tubes 175, 176, 177, 178 and 87, the latter of which is shorter than the others and is supplemented by tubes 180 to the rear at each side, having their inner ends braced by the tubes 181. The transverse tubes are connected by four longitudinal tubes 183, 184, 185 and 186 (as best appears in Figs. 21 and 35, the tube 101, heretofore mentioned in connection with the bumpers 105, Figs. 2, 5 and 19, extends around each end and lengthwise at each side of the body just above the floor, except where cut away for the doors 188, and there it is supplemented by short tubes 189 at a lower level).

Towards the front there are diagonal braces 190 converging at the junction of the tube 140 with an intermediate portion of the cross tube 175. This last mentioned cross tube 175 is reenforced by a short angle 191 (Figs. 25, 28 and 35) and in line with the longitudinal tubes 184, 185, there are truss tubes 192 (Figs. 28 and 36) extending from the angle 191 rearwardly to the transverse tube 87 opposite to the connection with the radius rods 77. There are also crosswise truss tubes 179 between the truss tubes 192 and connecting them with the longitudinal tubes 183 and 186 respectively (Fig. 36).

Turning now to Figs. 20 and 21, it will be seen that the transverse tubes 176, 177, 178 and the short tubes 180, extend upwardly at each side and over the top of the body frame, while the transverse tube 175 extends up each side to a junction 193 at the lower rear corner of the window 23.

Above the tube 101 on the right, a tube 194 extends lengthwise from the tube 177 at the front side of the door to the junction 193, to and between the pedestals 147 around to the left (Fig. 20) to the other junction 193 adjacent to the left door. It is omitted at the door but extends rearwardly from the rear side thereof to the tube 178 where it curves downwardly and then outwardly to the tube 101 at the junction 195.

At the right side to the rear of the door 188 there is a like continuation of the tube 194 to a similar junction 195 with the tube 101. Above the tube 194 there is a tube 196 (Figs. 20 and 21) extending along between the windows 22 and 29 over the window 24 (which is in the left door) 25, 26 (which is in the right door) 27, to the junctions 197 opposite to the outer corners of the windows 28, and from those junctions to a manifold junction 198, which is connected by a single tube 199 with the tube 101 at the extreme rear of the car.

A tube 200 runs rearwardly from each corner of the front overhead window 29 (Fig. 20) to the tube 177 and then is deflected outwardly and downwardly to a junction between the tubes 196 and 178. A ridge tube 201 extends along the top of the car from the window 29 to the tube 180 above and between the rear windows 28.

These windows (Fig. 12) are substantially upright in little valleys on opposite sides of a ridge 202 formed of sheet metal to continue the contour of the shell and make provision for tubing connecting the inlet side of the carburetor with the interior of the passenger space overhead.

Those valleys are just above and in front of the two doors 99 (Fig. 12) covering the power plant.

Turning again to Figs. 20 and 21, at the rear, it will be seen that there are tubes 203 running from the manifold junction 198 to each pedestal 95 and thence forwardly and downwardly to junctions with the tubes 180, 101 and 178. Also other tubes 204 extend downwardly from the tube 194 to the tubes 203 at the junctions with the tubes 101.

Taking Figs. 20, 21, 22, 23, and 34, it will be seen that the tubes 200, extending along the top, may be considered as extending downwardly and outwardly at each side of the front window 22 across the pedestals 147 down to manifold junctions 205 at each side of the car in front, from which braces 182 run to the front end of the tube 140 (to which the front axle sections are hinged). Junctions 205 are stayed laterally by a transverse tube 206 forming part of a stout truss work, best indicated generally at 207, (Fig. 23) inclined to the front transverse floor tube 175.

The front end of the tube 140 is also braced by a tube 208 (Figs. 21 and 22) inclining upwardly and outwardly to the extreme front portion of the tube 101 and then extended upwardly at 209 to the top ring 210 of a spare tire carrier, indicated generally by 211, the sheet metal parts and actual fastening of the tire being omitted in most of the views (Fig. 34 excepted) to better reveal the other parts. The upper ring 210, as best shown in Fig. 22, has stays 212 running to the pedestals 147. There are also lateral stays 213 (Fig. 22) and a bottom arch 214 (Fig. 21).

Tubular braces 215 (Figs. 21 and 28) connect the front transverse floor tube 175 with the pedestals 147 and serve to support the foot boards, not shown.

The rear portion 216 (Fig. 28) of the bottom arch 214 is connected by inclined stays 217 with the upturned part of the tube 175 and forms the support for the instrument board, not shown.

The front portion of the shell (Figs. 24 and 34) is provided with the door 218 hinged at 219 affording access to the spare tire carrier.

The junctions 205 at each side are also braced to each junction 193 by tube 220, and to the horizontal tube 101 by tubes 221 and 222. Another transverse tube 223 parallel to the tube 206 (between the junctions 205) extends from the junction of one tube 221 with the tube 101, to the other and forms a sort of cord brace for the bowed front end of the latter.

At the rear of the passenger space, the bottom transverse tube 87 is connected to the upper transverse tubes 89 and 90 by inclined braces 224 and 225 (Figs. 2, 5 and 20).

Radial engine drive (Figs. 41 and 42)

The invention lends itself very readily to embodiments for utilizing the highly developed radial engines as a source of power. One arrangement is shown more or less diagrammatically in Figs. 41 and 42, where 226 indicates a radial engine mounted in an air drum or barrel 227, the upper edge of which is attached to an annular ring of rubber 228 which, in turn, is made fast to a tubular ring 229 that serves in place of the pedestals 95 in the first form described. The lower portion of the drum 227 is closed except at the rear, where it forms, with the curved plate 230, a discharge for cooling air drawn in through the louvres 231 by the fan 232.

The drive from the engine is through a clutch 233 and an automatic transmission 234 to the differential 235, all diagrammatically shown in the drawings, because the detail here is a matter of selection.

At each side of the drum (Fig. 42) there are brackets 236 which are pivoted at 237 to the upper ends of oleos 238 resting on the rear axles 239, as described in connection with the other form. At the lower side the drum carries straps 240 for supporting the differential 235.

This arrangement is of especial advantage at the present time where more power is required than can be developed by the small production engines of the type illustrated in the other form described.

The use of the oleos for the supporting struts 11 and 12 is an incident born of the fact that they are readily available and furnish the damped or retarded resiliency desired. The particular form shown in Fig. 9 allows the spring to yield readily under shock and retards the recoil. A great many substitutes may be readily selected or devised.

In the car shown the rear oleos are inclined forwardly and inwardly as a concession to the particular conditions. Under other circumstances they would be inclined rearwardly and inwardly like the front oleos to meet the road shocks more directly.

The scheme of mounting the motor, etc., separate from the body frame can be carried out in connection with the front axles if for any reason it is preferred to have the motor in front.

Various other changes will occur as the invention is put to use by others and an attempt to suggest or illustrate them would be burdensome.

Certain of the inventive features of the rear window construction and the engine mounting disclosed in this application are described more in detail and claimed in my co-pending applications, Ser. No. 68,460 and Ser. No. 62,058 respectively.

I claim as my invention:

1. In a motor car, a pair of wheels, an axle housing for each wheel, a shaft in the corresponding housing for driving each wheel, a resilient strut rising from each axle housing adjacent to its wheel, a body having its rear end carried by the struts, a motor carried by the struts, means connecting the motor with the axles for driving them and a radius rod connecting each axle housing adjacent to each wheel with the body in front of the axle housing.

2. In a motor car, a pair of wheels, an axle housing for each wheel, a driving axle for each wheel in its housing, a motor, a transmission mechanism connecting the motor with the driving axles, means for resiliently supporting the motor, including struts, one rising from each axle housing adjacent to the wheel, a body carried by the struts and radius rods connecting the axle housings with the body.

3. In a motor car, a pair of wheels, an axle housing for each wheel, a driving axle for each wheel in its housing, a motor, a differential gearing driven by the motor, a universal joint between the differential gearing and each driving axle, means for resiliently supporting the motor, including struts, one rising from each axle housing adjacent to the wheel, a body carried by the struts and a radius rod connecting each axle housing adjacent to the wheel with the body.

4. In a motor car, a body having a separate chamber adjacent to an end and open at the bottom, an axle, a power plant in the chamber, struts rising from the end portions of the axle into the chamber, and means for supporting the power plant and the body on the struts.

5. In a motor car, a body having a separate chamber adjacent to an end and open at the bottom, an axle, a power plant in the chamber, struts rising from the end portions of the axle into the chamber, means for supporting the power plant and the body on the struts, and radius rods connecting the axle and the body.

6. In a motor car, a car body having a body frame, a pair of wheels, axle sections, means for pivotally connecting certain of said sections directly to the body frame to swing about a substantially horizontal axis, a steering knuckle for each axle section and resilient means for supporting the front end of the body including a strut rising from an axle section adjacent to the steering knuckle to a point above the center of gravity of the body.

7. In a motor car, a car body having a body frame, axle sections, means for pivotally connecting certain of said axle sections directly to the body frame adjacent to the bottom to swing about a substantially horizontal axis, a steering knuckle and wheel for each axle section, a strut rising from each axle section to a point above the center of gravity of the car body, and resilient means for supporting the car body on the struts.

8. In a motor car, a car body, forked axle sections with the ends of the forks pivoted to the body to swing up and down about an axis extending lengthwise to the car, a steering knuckle carried by each axle section, and a resilient support for the body including a strut fast to each axle section and extending up into the body above the center of gravity thereof and secured directly thereto.

9. In a motor car, front and rear sectional axles, wheels therefor, a body, and an inclined resilient strut movably connected to and extending upwardly from the end portion of each axle and connected to the body above the horizontal plane of the center of gravity thereof, said body enclosing said struts.

10. In a motor car, a body, a pair of wheels, axle sections, each pivoted to the body to swing in a vertical plane about a substantially horizontal axis, a steering knuckle for each axle section, resilient means for supporting the front end of the body including a strut rising from an axle section adjacent to the steering knuckle at each side of the car to a point above the center of gravity of the body, and steering mechanism including a steering knuckle arm for each steering knuckle, an intermediate lever mounted on the body, links connecting the intermediate lever and the steering knuckle arms and means for moving the intermediate lever.

11. In a motor car, a pair of wheels, an axle, a differential supported by the axle, a strut rising from the axle adjacent to each wheel, a radial engine suspended from the struts and connected with the differential.

12. In a motor car, a body, a pair of wheels, an axle for the wheels, a strut rising from the axle adjacent to each wheel for supporting said body, and a motor between and suspended from the struts independent of the body.

13. In a motor car, a body, a pair of wheels, an axle for the wheels, means including a strut rising from the axle adjacent to each wheel for supporting said body, a motor between and suspended from the struts independent of the body, and differential gearing suspended from the motor.

14. In a motor car, a body, a pair of wheels, an axle for the wheels, means for resiliently mounting the body including a strut rising from the axle adjacent to each wheel, and a motor borne by the struts independently of the body.

15. In a motor car, a body, a pair of wheels, an axle for the wheels, means for resiliently mounting the body including a strut rising from the axle adjacent to each wheel, a motor borne by the struts independently of the body, and means to connect the motor to the body to resist torque.

16. In a motor car, a body, a pair of wheels, an axle section for each wheel pivoted with respect to the body, a motor, and means for mounting the motor independent of support from the body including a strut rising from each axle section adjacent to the corresponding wheel to points above the center of gravity of the motor.

17. In a motor car, a body, a pair of wheels, an axle section for each wheel pivoted with respect to the body, a motor, and means for mounting the motor independent of support from the body including a strut rising from each axle section adjacent to the corresponding wheel to points above the center of gravity of the motor, and a cross strut connecting the upper portions of the first two struts.

18. In a motor vehicle, an axle comprising intermediate and end sections pivotally connected together, a differential carried by the intermediate section, a motor rigidly connected to said intermediate section, and means for yieldably supporting said motor from said end sections.

19. In a motor vehicle, a body, front and rear axles, each axle comprising intermediate and end sections pivotally connected together, means for rigidly connecting said body to certain of said sections, means for resiliently supporting said body from certain other of said sections, the intermediate section of one of said axles comprising a differential, a motor fixed relative to said differential, and means for resiliently supporting said motor from said end sections.

20. In a motor vehicle, a body, front and rear axles, each axle comprising an intermediate section, end sections and means for pivotally connecting said end sections to said intermediate section for permitting the end sections to swing in a vertical plane, means for rigidly mounting said body on said intermediate sections, and resilient means for supporting said body from said end sections.

21. In a motor vehicle, a body, front and rear axles, said rear axle comprising a plurality of sections pivotally connected together, a pair of standards for each axle, each standard pivotally connected at one end to the corresponding axle outwardly of the intermediate section thereof and at its other end attached to said body, means for holding the connections between the standards for each axle, respectively, at a fixed distance apart, and means for resiliently resisting the relative movement of said standards and axles.

22. In a motor vehicle having a body, means including wheels and front and rear axles for supporting said body, said rear axle comprising a plurality of articulated sections, a removable power unit comprising said rear axle and wheels thereon, a motor, a differential between the sections of said axle and means for supporting said motor and differential from said rear axle, and means for detachably connecting said unit to said vehicle whereby said unit may be readily removed from said vehicle to afford access to said motor.

23. In a motor vehicle, a vehicle body, means including a power unit for supporting said body and for propelling said vehicle, said unit comprising a sectional axle, wheels on said axle, a motor, resilient supporting means pivotally connected to and extending upward from said axle for resiliently supporting said motor, means for rigidly connecting said motor to said supporting means, and means for detachably connecting said body to said supporting means.

24. In a motor vehicle, axle sections, a motor, means for resiliently mounting said motor on certain of said sections comprising resilient supporting members on said sections, means for rigidly connecting certain portions of said sections to said motor to prevent relative movement thereof, and flexible connections between certain other portions of said sections and motor for providing relative movement between said motor and members.

25. In a motor vehicle, front and rear sectional axles, means for pivotally connecting said sections together to provide relative vertical movement of said sections, resilient supporting members pivotally connected to said axles and extending upwardly and inwardly therefrom, a body, and means for flexibly connecting said body to the upper portion of said members above the center of gravity of said body whereby on turning curves at high speeds said members will cause banking of said body.

26. In a motor vehicle, a body, an articulated axle, a radial engine above said axle for driving the same, and resilient supporting members pivotally connected to said axle and motor for supporting an annular rubber positioning member between said body and motor.

27. In a motor car, front and rear sectional axles, means for pivotally connecting said sections together to provide for relative vertical movement of the said sections, wheels therefor, a vehicle body, and means to support the body on the axles including four resilient struts, each rising from a different axle section and connected to said body and means at each end of said body for rigidly connecting the same to the intermediate sections of said axles.

28. In a motor car, front and rear sectional axles, wheels therefor, a motor on the rear axle for propelling said car, a body, and four inclined struts, one rising from an axle section adjacent to each wheel and connecting to the body at points above the center of gravity of said body.

29. In a motor car, front and rear axles, wheels therefor, said rear axle having intermediate and end sections, a motor on the intermediate section of the rear axle for propelling said car, a body, a strut on each axle adjacent to each wheel extending up into the body, means on the upper portions of the struts for mounting the body on the struts, and means for connecting the forward portion of said motor to said body.

30. In a motor car, a car body provided with a rear compartment having a discharge opening at its rear, a rear axle, a motor carried thereby within said compartment, and means to cool the motor including a fan taking air in from above and forcing it across said motor within said compartment and from thence out through a restricted opening in the rear lower portion of said compartment whereby air within said compartment will be maintained at slightly super-atmospheric pressure during the operation of said motor.

31. In a motor vehicle provided with a body, an axle comprising a plurality of sections, means for resiliently supporting said body from said axle, a motor, means for rigidly connecting said motor to certain of said sections, means for resiliently connecting said motor to certain other of said sections, and means for directly connecting said motor to said body.

32. In a motor vehicle, front and rear sectional axles, a vehicle body, resilient supporting means extending upwardly from said axles, a motor rigidly mounted on certain of the axle sections, means for movably connecting said motor to said supporting means, and means connecting said supporting means to said body for resiliently supporting the same whereby on turning curves at high speeds the mounting of said body will cause banking thereof.

WILLIAM B. STOUT.